United States Patent
Ding et al.

(10) Patent No.: US 12,283,075 B2
(45) Date of Patent: Apr. 22, 2025

(54) METHOD AND APPARATUS FOR MULTI-LEARNING RATES OF SUBSTITUTION IN NEURAL IMAGE COMPRESSION

(71) Applicant: TENCENT AMERICA LLC, Palo Alto, CA (US)

(72) Inventors: Ding Ding, Palo Alto, CA (US); Wei Jiang, Sunnyvale, CA (US); Sheng Lin, San Jose, CA (US); Wei Wang, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 395 days.

(21) Appl. No.: 17/499,959

(22) Filed: Oct. 13, 2021

(65) Prior Publication Data

US 2022/0343552 A1    Oct. 27, 2022

Related U.S. Application Data

(60) Provisional application No. 63/176,204, filed on Apr. 16, 2021.

(51) Int. Cl.
*H04N 19/184* (2014.01)
*G06N 3/08* (2023.01)
(Continued)

(52) U.S. Cl.
CPC .............. *G06T 9/002* (2013.01); *G06N 3/08* (2013.01); *H04N 19/184* (2014.11);
(Continued)

(58) Field of Classification Search
CPC . G06T 9/002; G06T 2207/20084; G06N 3/08; G06N 3/045; G06N 3/047;
(Continued)

(56) References Cited

U.S. PATENT DOCUMENTS

2014/0177721 A1   6/2014 Onno et al.
2020/0051287 A1*  2/2020 Wihlidal ................... G06T 7/11
(Continued)

FOREIGN PATENT DOCUMENTS

ES          2310157 A1 * 12/2008 ........... H04N 19/122
JP          7374340 B2    11/2023
WO       2020/174216 A1     9/2020

OTHER PUBLICATIONS

Yang et al, Slimmable Compressive Autoencoders for Practical Neural Image Compression, 2021, arXiv:2102.15726v1, pp. 1-12. (Year: 2021).*

(Continued)

*Primary Examiner* — Kathleen M Broughton
(74) *Attorney, Agent, or Firm* — Sughrue Mion, PLLC

(57) ABSTRACT

Neural network based substitutional end-to-end (E2E) image compression (NIC) being performed by at least one processor and includes receiving an input image to an E2E NIC framework, determining a substitute image based on a training model of the E2E NIC framework, encoding the substitute image to generate a bitstream, mapping the substitute image to the bitstream to generate a compressed representation of the input image. Further, the input may be partitioned into blocks for which a substitute representation is determined for each block and each block is encoded instead of the entire substitute image.

9 Claims, 6 Drawing Sheets

(51) Int. Cl.
  *G06T 9/00* (2006.01)
  *G11B 20/00* (2006.01)
(52) U.S. Cl.
  CPC .. *G06F 2212/455* (2013.01); *G11B 20/00007* (2013.01); *H04Q 2213/034* (2013.01)
(58) Field of Classification Search
  CPC .... G06N 3/084; H04N 19/184; H04N 19/117; H04N 19/119; H04N 19/14; H04N 19/147; H04N 19/176; G06F 2212/455; G11B 20/00007; H04Q 2213/034
  See application file for complete search history.

(56) References Cited

U.S. PATENT DOCUMENTS

| | | | |
|---|---|---|---|
| 2020/0137384 A1 | 4/2020 | Kwong et al. | |
| 2020/0160565 A1* | 5/2020 | Ma | H04N 19/60 |
| 2020/0351509 A1* | 11/2020 | Lee | G06N 3/04 |
| 2020/0366914 A1* | 11/2020 | Schroers | H04N 19/513 |
| 2022/0030246 A1* | 1/2022 | Xu | H04N 19/149 |
| 2022/0230362 A1* | 7/2022 | Jiang | H04N 19/115 |

OTHER PUBLICATIONS

Ma et al, Improving Compression Artifact Reduction via End-to-End Learning of Side Information, 2020, IEEE international Conference on Visual Communications and Image Processing, pp. 1-4. (Year: 2020).*

Rippel et al, Real-Time Adaptive Image Compression, 2017, arXiv:1705.05823v1, pp. 1-16. (Year: 2017).*

Mentzer et al, Learning Better Lossless Compression Using Lossy Compression, 2020, IEEE/CVF Conference on Computer Vision and Pattern Recognition, pp. 1-12. (Year: 2020).*

Lin et al, Spatial RNN Codec for End-to-End Image Compression, 2020, IEEE/CVF Conference on Computer Vision and Pattern Recognition, pp. 1-10. (Year: 2020).*

Tellez et al, Neural Image Compression for Gigapixel Histopathology Image Analysis, 2020, arXiv: 1811.02840v2, pp. 1-15. (Year: 2020).*

Ma et al, Improving Compression Artifact Reduction via End-to-End Learning of Side Information, 2020, IEEE International Conference on Visual Communications and Image Processing, pp. 1-5. (Year: 2020).*

Galanopoulos et al, Measurement-driven Analysis of an Edge-Assisted Object Recognition System, 2020, arXiv: 2003.03584v1, pp. 1-7. (Year: 2020).*

Yang et al, Slimmable Compressive Autoencoders for Practical Neural Image Compression, 2021, arXiv: 2103.15726v1, pp. 1-12. ( Year: 2021).*

Chen et al, Neural Image Compression via Non-Local Attention Optimization and Improved Context Modeling, 2019, arXiv: 1910.06244v1, pp. 1-13. (Year: 2019).*

Extended European Search Report issued Jul. 7, 2023 in European Application No. 21928340.5.

Wei Wang et al., "Substitutional Neural Image Compression" International Organisation for Standardisation Organisation Internationale de Normalisation ISO/IEC JTC1/SC29/WG11 Coding of Moving Pictures and Audio, ISO/IEC JTC1/SC29/WG11 MPEG2020/M54739, Jun. 2020, Virtual Meeting (7 pages total).

Caglar Aytekin et al., "Block-optimized Variable Bit Rate Neural Image Compression", arXiv:1805.10887v1 [cs.LG], Cornell University Library, May 28, 2018, pp. 1-4 (4 pages total).

Xiao Wang et al., "Substitutional Neural Image Compression", arXiv:2105.07512v1 [cs.CV], Cornell University Library, May 16, 2021 (8 pages total).

International Search Report dated Feb. 1, 2022 in International Application No. PCT/US21/55039.

Written Opinion of the International Searching Authority dated Feb. 1, 2022 in International Application No. PCT/US21/55039.

David Tellez et al., "Neural Image Compression for Gigapixel Histopathology Image Analysis", IEEE transactions on pattern analysis and machine intelligence, 2020, arXiv:1811.02840v2, pp. 1-15 (15 pages).

Talebi, Hossein et al., "Better Compression with Deep Pre-Editing" arXiv:2002.00113v1, Feb. 1, 2020 13 pages total, Retrieved from the Internet: <URL: https://arxiv.org/abs/2002.00113v1>, https://doi.org/10.48550/arXiv.2002.00113.

Communication dated Jan. 9, 2024, issued in Japanese Application No. 2022-564637.

* cited by examiner

METHOD AND APPARATUS FOR MULTI-LEARNING RATES OF SUBSTITUTION IN NEURAL IMAGE COMPRESSION

CROSS-REFERENCE TO RELATED APPLICATION

This application is based on and claims priority to U.S. Provisional Patent Application No. 63/176,204, filed on Apr. 16, 2021, the disclosure of which is incorporated by reference herein in its entirety.

BACKGROUND

A traditional hybrid video codec is difficult to be optimized as a whole. An improvement of a single module may not result in a coding gain in overall performance. Recently, Standard groups and companies have been actively searching for potential needs for standardization of future video coding technology. These standard groups and companies have established JPEG-AI group focusing on AI-based end-to-end neural image compression using Deep Neural Networks (DNN). The Chinese AVS standard has also formed AVS-AI special group to work on neural image and video compression technologies. The success of recent approaches has brought more and more industrial interests in advanced neural image and video compression methodologies.

SUMMARY

According to exemplary embodiments, a method of substitutional end-to-end (E2E) neural image compression (NIC) using a neural network, performed by at least one processor, including receiving an input image to an E2E NIC framework, determining a substitute image based on a training model of the E2E NIC framework, encoding the substitute image to generate a bitstream, and mapping the substitute image to the bitstream to generate a compressed representation.

According to exemplary embodiments, an apparatus for substitutional end-to-end (E2E) neural image compression (NIC) using a neural network, the apparatus comprising at least one memory configured to store program code, and at least one processor configured to read the program code and operate as instructed by the program code. The program code including receiving code configured to cause at least one processor to receive an input image to an E2E NIC framework, first determining code configured to cause at least one processor to determine a substitute image, based on a training model of the E2E NIC framework, first encoding code configured to cause at least one processor to encode the substitute image to generate a bitstream, and mapping code configured to cause at least one processor to map the substitute image to the bitstream to generate a compressed representation.

According to exemplary embodiments, a non-transitory computer readable medium storing instructions that, when executed by at least one processor for substitutional end-to-end (E2E) neural image compression (NIC), cause the at least one processor to receive an input image to an E2E NIC framework, determine a substitute image, based on a training model of the E2E NIC framework, encode the substitute image to generate a bitstream, and map the substitute image to the bitstream to generate a compressed representation.

DETAILED DESCRIPTION

Embodiments may include receiving a picture and determining a substitutional representation of the picture by performing an optimization process to tune elements of the substitutional representation of the picture to optimize a rate-distortion performance of coding the substitutional representation of the picture based on an end-to-end (E2E) optimized framework. The E2E optimized framework can be an artificial neural network (ANN) based image or video coding framework that is pretrained. The substitutional representation of the picture can be encoded to generate a bitstream. In an artificial neural network-based video coding framework, by performing a machine learning process, different modules can be jointly optimized from input to output to improve a final objective (e.g., rate-distortion performance), resulting in an end-to-end (E2E) optimized Neural Image Compression (NIC).

Figure 1:
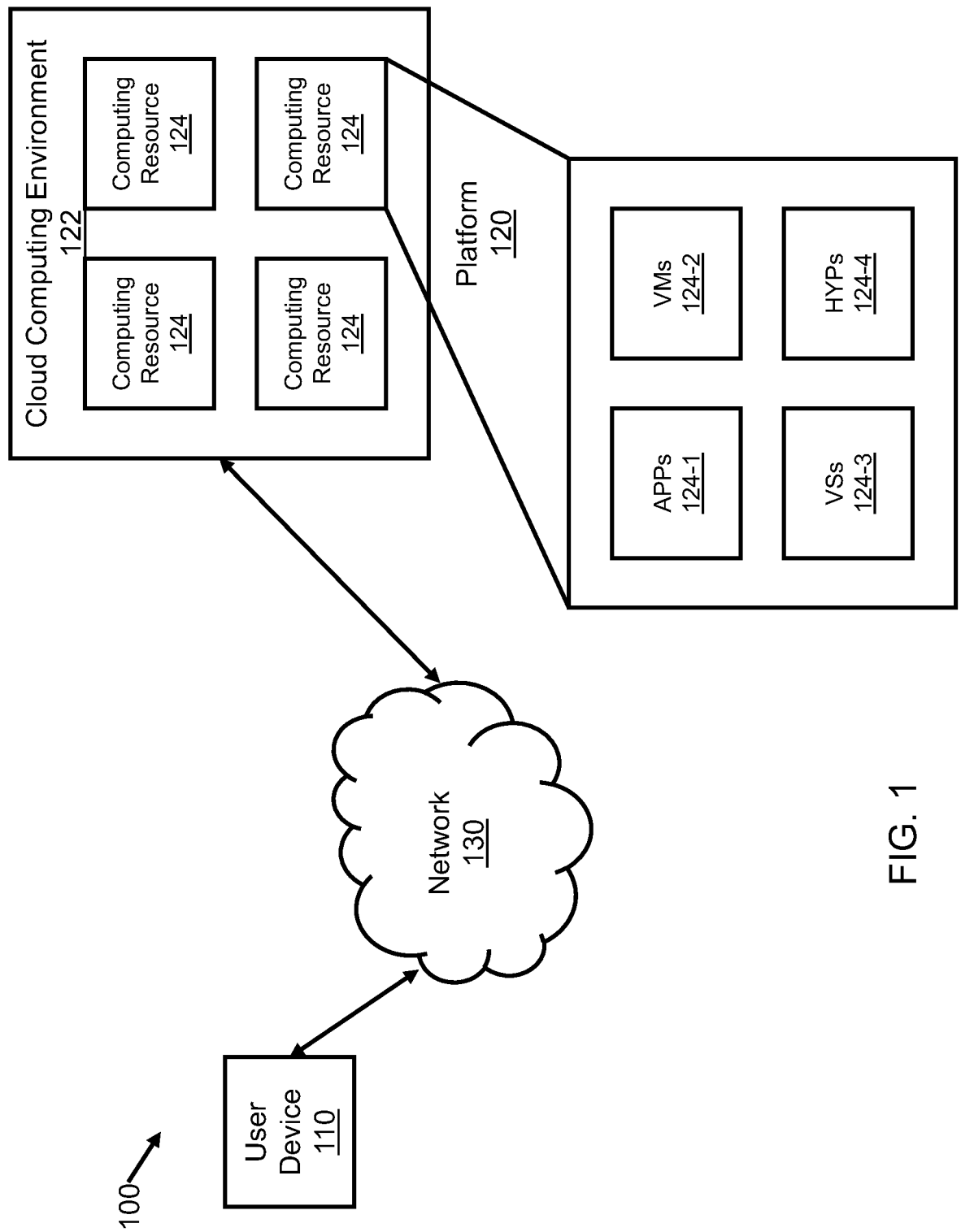
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
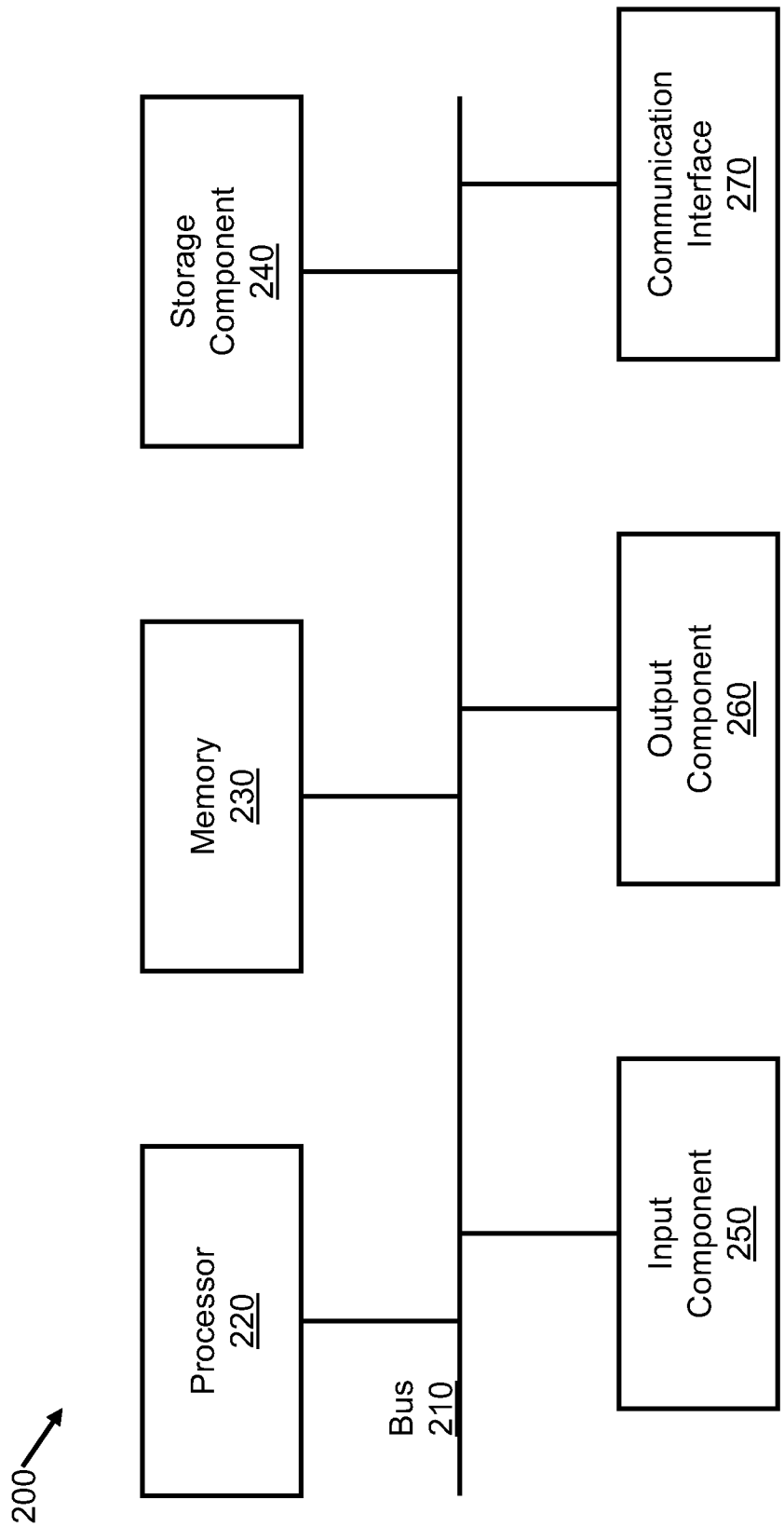
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Given an input image x, the target of NIC is to use the image x as the input to a DNN encoder to compute a compressed representation $\hat{x}$ that is compact for storage and transmission purposes. And then, use the compressed representation $\hat{x}$ as the input to a DNN decoder to reconstruct an image $\bar{x}$. Some NIC methods may take a variational autoencoder (VAE) structure, where the DNN encoders directly use the entire image x as its input, which is passed through a set of network layers that work like a black box to compute the output representation (i.e. the compressed representation $\hat{x}$). Correspondingly, the DNN decoders take the entire compressed representation $\hat{x}$ as its input, which is passed through another set of network layers that work like another black box to compute the reconstructed image x. A Rate-Distortion (R-D) loss is optimized to achieve trade-off between the distortion loss $D(x, \bar{x})$ of the reconstructed image $\bar{x}$ and the bit consumption R of the compressed representation $\hat{x}$ with a trade-off hyperparameter λ using the following target loss function L (x, $\bar{x}$, $\hat{x}$):

$$L(x,\bar{x},\hat{x})=\lambda D(x,\bar{x})+R(\hat{x}) \qquad \text{Equation (1)}$$

Embodiments relating to the preprocessing propose that, for each input image to be compressed, online training may be used to find an optimal substitute and compress this substitute instead of the original image. By using this substitute, the encoder can achieve better compression performance. This method is used as a preprocessing step for boosting the compression performance of any E2E NIC compression method. It does not require any training or fine-tuning on the pretrained compression model itself or any training data. A detailed method and an apparatus for the preprocessing model, according to one or more embodiments, will now be described.

Figure 3:
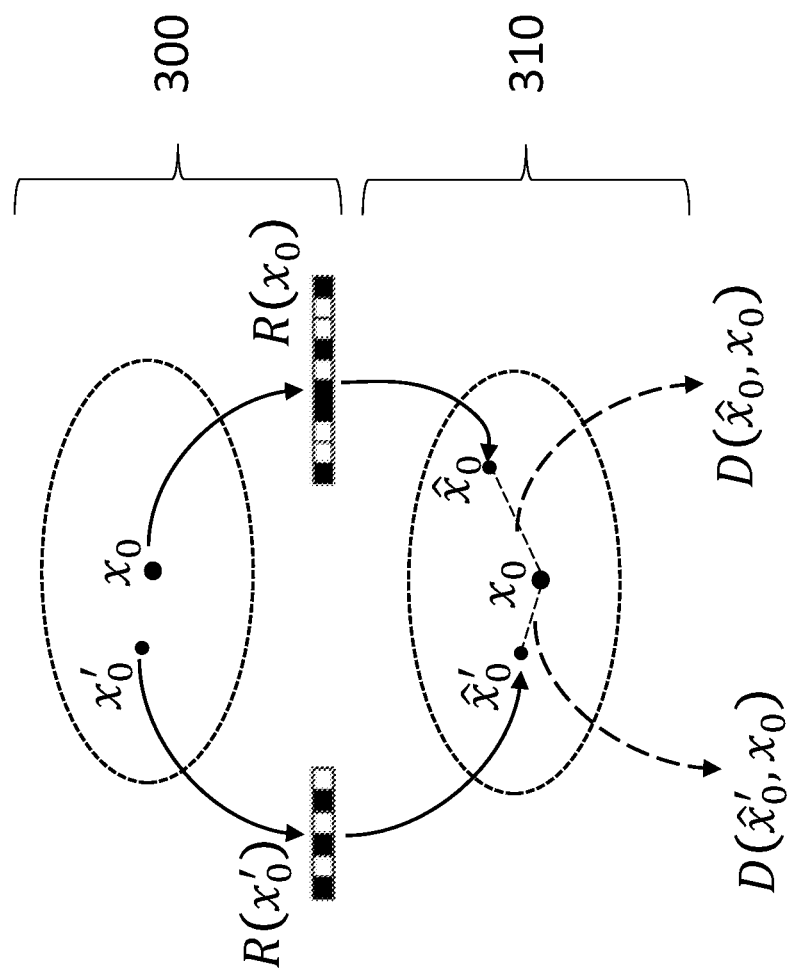
FIG. 3 is an example diagram illustrating a substitutional learning-based image coding preprocessing model.

FIG. 3 is an example diagram illustrating a substitutional learning-based image coding preprocessing model.

Learning-based image compression can be viewed as a two-step mapping process. As shown in FIG. 3, the original image $x_0$ in a high dimensional space is mapped to a bit-stream with length $R(x_0)$ (an encoding mapping 300), which is then mapped back to the original space at $\widehat{x_0}$ (a decoding mapping 310) with a distortion loss $D(\widehat{x_0}, x_0)$.

In an example embodiment, as shown in FIG. 3, if there exists a substitution image $x_0'$ such that it is mapped to a bit-stream with length $R(x_0')$, which is then mapped to a space $\widehat{x_0'}$ that is closer to the original image $x_0$ with a distortion loss $D(\widehat{x_0'}, x_0)$. Given a distance measurement or loss function, better compression can be achieved using a substitution image. Best compression performance is achieved at the global minimum of the target loss function according to Equation (1). In another example embodiment, substitutions may be found in any middle steps of the ANN, to reduce the differences between the decoded image and the original image $x_0$.

Unlike in a model training phase where the gradient is used for updating the model's parameters, in the preprocessing model, the model's parameters are fixed and the gradient may be used to update the input image itself. The entire model is made differentiable (so that the gradients can be backpropagated) by replacing the non-differentiable parts with differentiable ones (e.g., replacing quantization with noise injection). Therefore, the above optimization can be iteratively solved by gradient descent.

There are two key hyperparameters in this preprocessing model: step size and number of steps. Step size indicates the 'learning rate' of the online training. Images with different types of content may correspond to different step sizes to achieve the best optimization results. Number of steps indicates the number of updates operated. Together with the target loss function L (x, $\bar{x}$, $\hat{x}$), the hyperparameters are used for the learning process. For example, the step size may be used in a gradient descent algorithm or a backpropagation calculation performed in the learning process. The number of iterations may be used as a threshold of a maximum number of iterations to control when the learning process can be terminated.

Figure 4:
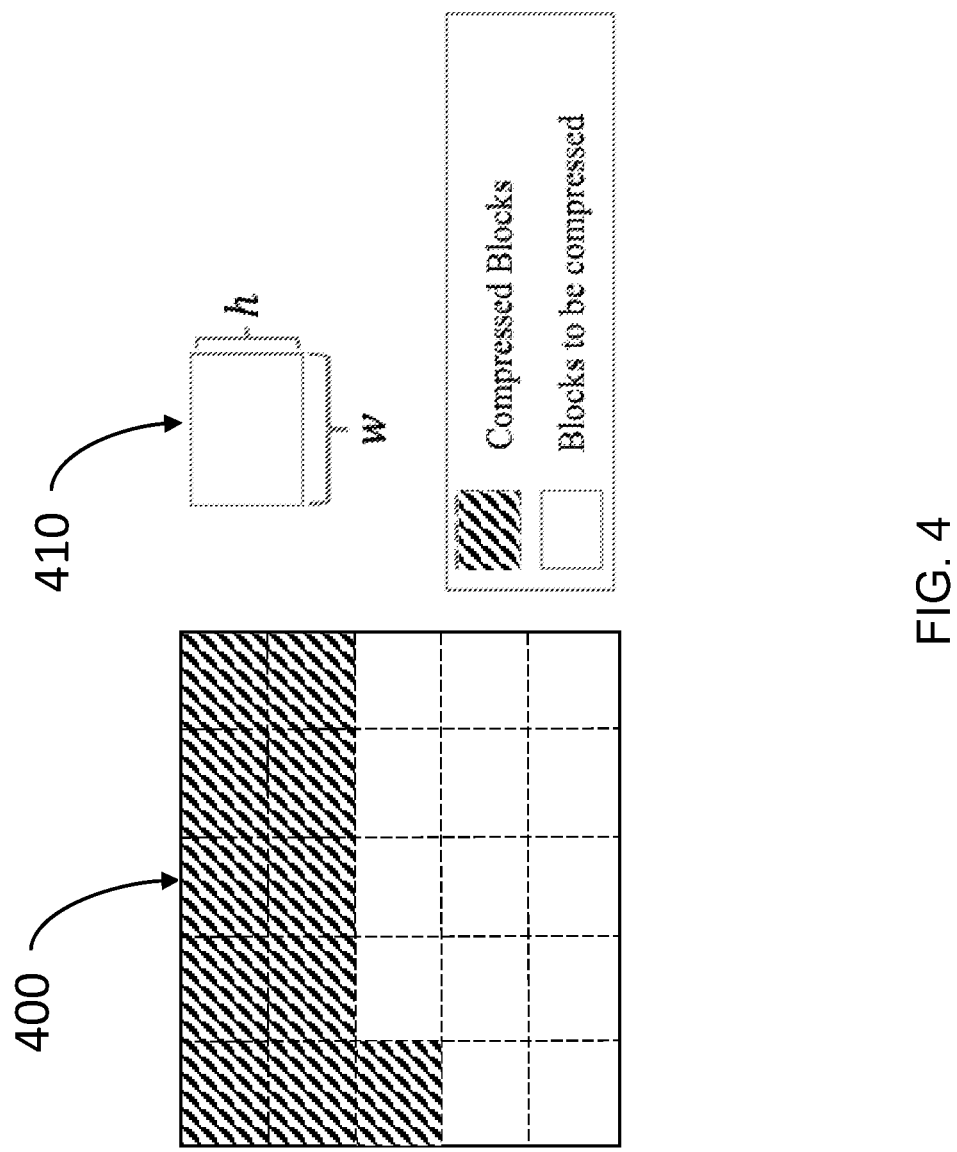
FIG. 4 illustrates an example of block-wise image coding.

FIG. 4 illustrates an example of block-wise image coding.

In an example embodiment, an image 400 may first split into blocks (illustrated by the dashed line in FIG. 4) and the spilt blocks may be compressed instead of the image 400 itself. The compressed blocks are shaded in FIG. 4 and the blocks to be compressed are not shaded. The split blocks may be equally sized or non-equally sized. The step size for each block may be different. To this end, different step sizes may be assigned for an image 400 in order to achieve better compression result. Block 410 is an example of one of the split blocks with a height h and width w.

In an example embodiment, an image may be compressed without splitting into blocks and the entire image is the input of the E2E NIC model. Different images may have different step sizes to achieve optimized compression results.

In another example embodiment, the step size may be chosen based on the characteristics of the image (or a block), for example, an RGB variance of the image. In embodiments, RGB may refer to a red-green-blue color model. Further, in another example embodiment, the step size may be chosen based on an RD performance of the image (or the block). Therefore, according to embodiments thereof, multiple substitutions are generated based on multiple step sizes, and the one with the better compression performance is chosen.

Figure 5:
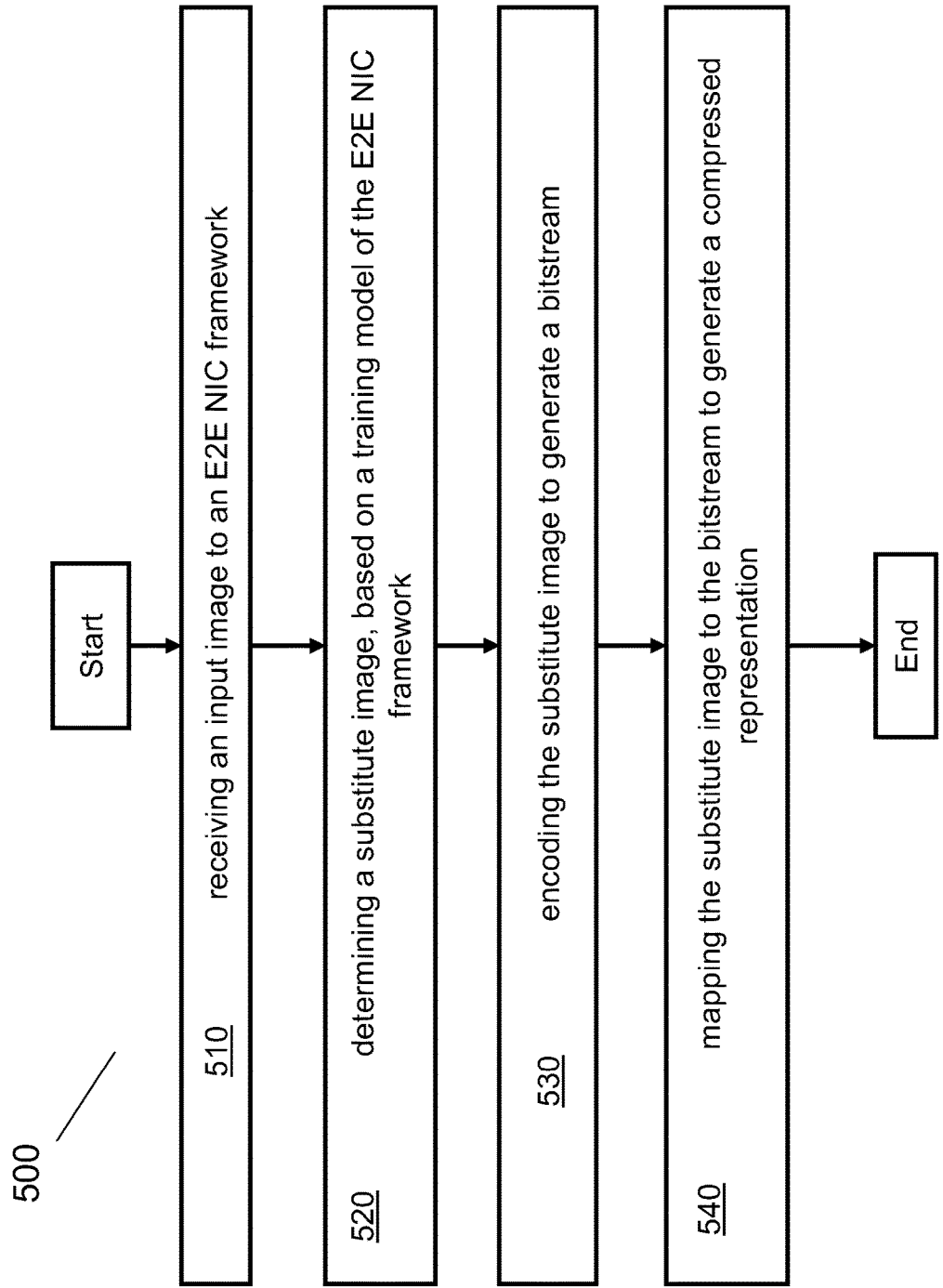
FIG. 5 is a flowchart of a method of substitutional end-to-end (E2E) neural image compression (NIC), according to embodiments.

FIG. 5 is a flowchart of a method 500 of substitutional end-to-end (E2E) neural image compression (NIC), according to the embodiments.

In some implementations, one or more process blocks of FIG. 5 may be performed by the platform 120. In some implementations, one or more process blocks of FIG. 11 may be performed by another device or a group of devices separate from or including the platform 120, such as the user device 110.

As shown in FIG. 5, in operation 510, the method 500 includes receiving an input image to an E2E NIC framework.

In operation 520, the method 500 includes determining a substitute image, based on a training model of the E2E NIC framework. The substitution image may be determined by an optimization process of the training model of the E2E NIC framework. This is done by adjusting elements of the input image to generate substitute representations, and selecting the elements with a least distortion loss between the input image and the substitute representations to use as the substitute image. Further, the training model of the E2E NIC framework may be trained based on a learning rate of the input image, a number of updates to the input image, and a distortion loss. One or more substitute images may be determined based on the different learning rates of the input image. The learning rates are selected based on characteristics of the input image. The characteristics may be a RGB variance of the input image or an RD performance of the input image.

In a case where the input image is split into blocks, the substitution block may be determined by an optimization process of the training model of the E2E NIC framework by adjusting elements of the split blocks to generate substitute block representations, and selecting the elements with a least distortion loss between the split blocks and the substitute block representations to use as the substitute block. Further, the training model of the E2E NIC framework may be trained based on a learning rate of the split blocks, a number of updates to the split blocks, and a distortion loss of each of the split blocks. One or more substitute blocks may be determined based on the different learning rates of the split blocks. The learning rates are selected based on characteristics of the split blocks. The characteristics may be a RGB variance of the split blocks or an RD performance of the split blocks.

In operation 530, the method 500 includes encoding the substitute image to generate a bitstream.

In operation 540, the method 500 includes mapping the substitute image to the bitstream to generate a compressed representation. In embodiments, one or more of the bitstream or the compressed representation may be transmitted to, for example, a decoder and/or a receiving apparatus.

The method 500 may also include splitting the input image into one or more blocks. In this case, operations 520-540 are performed on each of the blocks instead of the entire input image. That is, the method 500 would further include determining a substitute block for each of the split blocks, based on the training model of the E2E NIC framework, encoding the substitute block to generate a block bitstream, and mapping the substitute block to the block bitstream to generate a compressed block. The split blocks may have the same size or different sizes, and each block has a different learning rate.

The method 500 may use an artificial neural network based on a pretrained image coding model wherein the parameters of the artificial neural network are fixed and a gradient is used to update the input image.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

Figure 6:
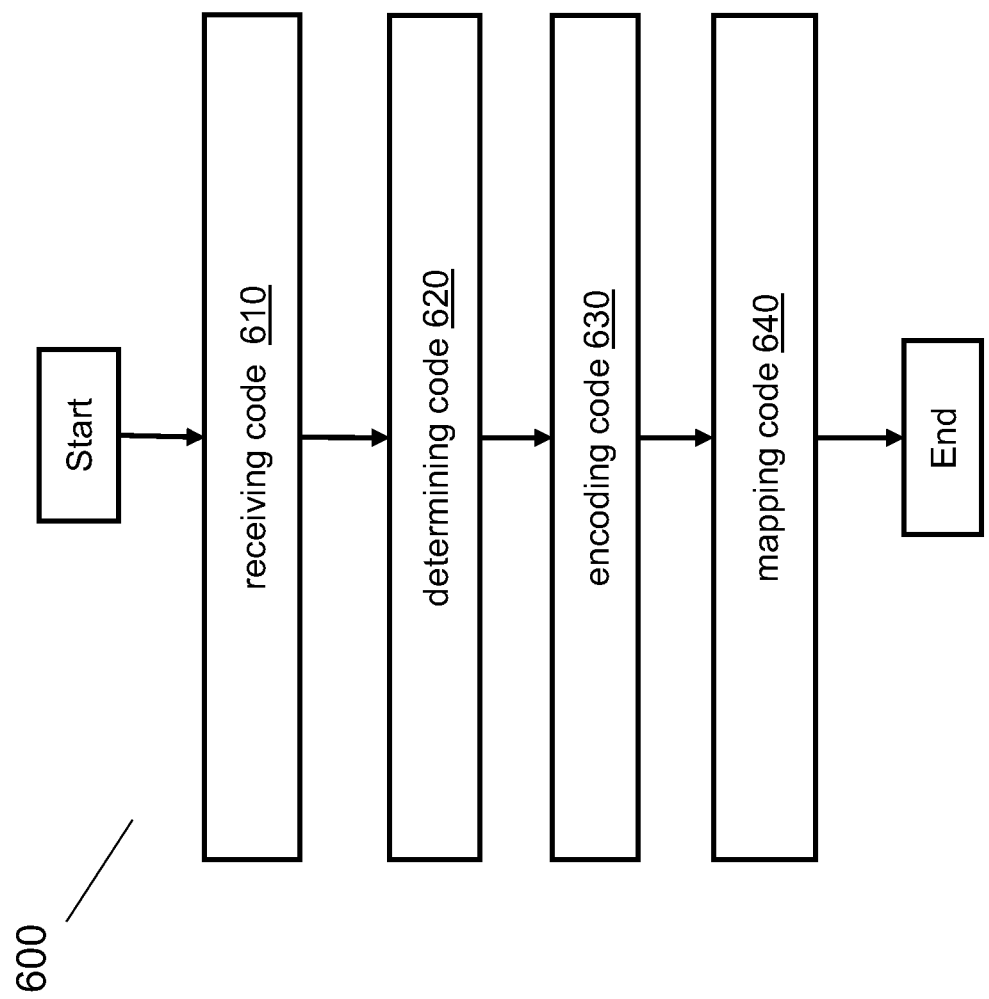
FIG. 6 is a block diagram of an apparatus for substitutional end-to-end (E2E) neural image compression (NIC), according to embodiments.

FIG. 6 is a block diagram of an apparatus 600 of substitutional end-to-end (E2E) neural image compression (NIC), according to the embodiments.

As shown in FIG. 6, the apparatus 600 includes receiving code 610, determining code 620, encoding code 630, and mapping code 640.

The receiving code 610 is configured to cause at least one processor to receive an input image to an E2E NIC framework.

The determining code 620 is configured to cause at least one processor to determine a substitute image, based on a training model of the E2E NIC framework.

The encoding code 630 is configured to cause at least one processor to encode the substitute image to generate a bitstream.

The mapping code 640 is configured to cause at least one processor to map the substitute image to the bitstream to generate a compressed representation.

The apparatus 600 may further include splitting code configured to cause at least one processor to split the input image into one or more blocks. In this case, the determining code 620, the encoding code 630, and the mapping code 640 are performed using each of the split blocks instead of the entire input image.

The substitution image determined by the determining code 620 may be determined by an optimization process of the training model of the E2E NIC framework. This is done by adjusting code configured to cause at least one processor to adjust elements of the input image to generate substitute representations, and selecting code configured to cause at least one processor to select the elements with a least distortion loss between the input image and the substitute representations as the substitute image. Further, the training model of the E2E NIC framework may be trained based on a learning rate of the input image, a number of updates to the input image, and a distortion loss. One or more substitute images may be determined based on the different learning rates of the input image. The learning rates are selected based on characteristics of the input image. The characteristics may be a RGB variance of the input image or an RD performance of the input image.

Additionally, the apparatus 600 may use an artificial neural network based on a pretrained image coding model wherein the parameters of the artificial neural network are fixed and a gradient is used to update the input image.

Although FIG. 6 shows example blocks of the apparatus, in some implementations, the apparatus may include additional blocks, fewer blocks, different blocks, or differently arranged blocks than those depicted in FIG. 6. Additionally, or alternatively, two or more of the blocks of the apparatus may be combined.

Embodiments herein describe E2E image compression methods. The methods exploit substitution mechanisms to improve the NIC coding efficiency by using a flexible and general framework that accommodates various types of quality metrics.

The E2E image compression methods, according to one or more embodiments, may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claims is:

1. A method of substitutional end-to-end (E2E) neural image compression (NIC) using a neural network performed by at least one processor, the method comprising:
    receiving an input image to an E2E NIC framework;
    splitting the input image into one or more blocks;
    performing an encoding mapping, for each of the one or more blocks, by mapping the input image to a first bitstream having a first length;
    performing a decoding mapping, for each of the one or more blocks, by mapping the first bitstream back to an original space with a first distortion loss;
    determining a substitute image from the original space, based on a training model of the E2E NIC framework;
    encoding the substitute image to generate a second bitstream; and
    mapping the substitute image to the second bitstream to generate a compressed representation,
    wherein the training model of the E2E NIC framework is trained based on a learning rate of the input image, a quantity of updates to the input image, and a second distortion loss,
    wherein a plurality of substitute images are determined based on learning rates that are selected based on characteristics of the input image, and
    wherein the substitute image is determined by performing an optimization process of the training model of the E2E NIC framework, comprising:
        adjusting RGB variance of the split blocks to generate substitute block representations; and
        selecting the RGB variance with a least distortion loss between the split blocks and the substitute block representations to use as the substitute block.

2. The method according to claim 1, further comprising:
    determining a substitute block for each of the one or more blocks, based on the training model of the E2E NIC framework;
    encoding the substitute block to generate a block bitstream; and
    mapping the substitute block to the block bitstream to generate a compressed block,
    wherein the one or more blocks have a same size, and each block of the one or more blocks has a different learning rate.

3. The method according to claim 1, wherein the training model of the E2E NIC framework is an artificial neural network based on pretrained image coding, and
    wherein parameters of the artificial neural network are fixed and a gradient is used to update the input image.

4. An apparatus for substitutional end-to-end (E2E) neural image compression (NIC) using a neural network, the apparatus comprising:
    at least one memory configured to store program code; and
    at least one processor configured to read the program code and operate as instructed by the program code, the program code comprising:
        receiving code configured to cause at least one processor to receive an input image to an E2E NIC framework;

splitting code configured to cause at least one processor to split the input image into one or more blocks;

first performing code configured to cause the at least one processor to perform an encoding mapping, for each of the one or more blocks, by mapping the input image to a first bitstream having a first length;

second performing code configured to cause the at least one processor to perform a decoding mapping, for each of the one or more blocks, by mapping the first bitstream back to an original space with a first distortion loss;

first determining code configured to cause at least one processor to determine a substitute image from the original space, based on a training model of the E2E NIC framework;

first encoding code configured to cause at least one processor to encode the substitute image to generate a second bitstream; and first mapping code configured to cause at least one processor to map the substitute image to the second bitstream to generate a compressed representation, wherein the training model of the E2E NIC framework is trained based on a learning rate of the input image, a quantity of updates to the input image, and a second distortion loss, wherein a plurality of substitute images are determined based on learning rates that are selected based on characteristics of the input image, and wherein the substitute image is determined by performing an optimization process of the training model of the E2E NIC framework, comprising:

adjusting code configured to cause at least one processor to adjust RGB variance of the split blocks to generate substitute block representations; and selecting code configured to cause at least one processor to select the RGB variance with a least distortion loss between the split blocks and the substitute block representations to use as the substitute block.

5. The apparatus of claim 4, further comprising:

second determining code configured to cause at least one processor to determine a substitute block for each of the one or more blocks, based on the training model of the E2E NIC framework;

second encoding code configured to cause at least one processor to encode the substitute block to generate a block bitstream; and second mapping code configured to cause at least one processor to map the substitute block to the block bitstream to generate a compressed block, wherein the one or more blocks have a same size, and each block of the one or more blocks has a different learning rate.

6. The apparatus according to claim 4, wherein the training model of the E2E NIC framework is an artificial neural network based on pretrained image coding, and wherein parameters of the artificial neural network are fixed and a gradient is used to update the input image.

7. A non-transitory computer readable medium storing instructions that, when executed by at least one processor for substitutional end-to-end (E2E) neural image compression (NIC), cause the at least one processor to:

receive an input image to an E2E NIC framework;

split the input image into one or more blocks;

perform an encoding mapping, for each of the one or more blocks, by mapping the input image to a first bitstream having a first length;

perform a decoding mapping, for each of the one or more blocks, by mapping the first bitstream back to an original space with a first distortion loss;

determine a substitute image from the original space, based on a training model of the E2E NIC framework;

encode the substitute image to generate a second bitstream; and map the substitute image to the second bitstream to generate a compressed representation, wherein the training model of the E2E NIC framework is trained based on a learning rate of the input image, a quantity of updates to the input image, and a second distortion loss, wherein a plurality of substitute images are determined based on learning rates that are selected based on characteristics of the input image, and wherein the instructions, when executed by at least one processor, further cause the at least one processor to performing an optimization process of the training model of the E2E NIC framework, comprising:

adjust RGB variance of the split blocks to generate substitute block representations; and select the RGB variance with a least distortion loss between the split blocks and the substitute block representations to use as the substitute block.

8. The non-transitory computer readable medium of claim 7, wherein the instructions, when executed by at least one processor, further cause the at least one processor to:

determine a substitute block for each of the one or more blocks, based on the training model of the E2E NIC framework;

encode the substitute block to generate a block bitstream; and map the substitute block to the block bitstream to generate a compressed block, wherein the one or more blocks have a same size, and each block of the one or more blocks has a different learning rate.

9. The non-transitory computer readable medium of claim 7, wherein the training model of the E2E NIC framework is an artificial neural network based on pretrained image coding, and wherein parameters of the artificial neural network are fixed and a gradient is used to update the input image.

* * * * *